(12) United States Patent
Corma Canós et al.

(10) Patent No.: US 7,857,981 B2
(45) Date of Patent: Dec. 28, 2010

(54) BIMETALLIC CATALYST FOR THE TREATMENT OF WATER CONTAINING NITRATES

(75) Inventors: Avelino Corma Canós, Valencia (ES); Antonio Eduardo Palomares Gimeno, Valencia (ES); Jose Gregorio Prato Moreno, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 45 days.

(21) Appl. No.: 12/195,401

(22) Filed: Aug. 20, 2008

(65) Prior Publication Data

US 2008/0302736 A1    Dec. 11, 2008

Related U.S. Application Data

(60) Division of application No. 10/735,597, filed on Dec. 12, 2003, now abandoned, which is a continuation of application No. PCT/ES02/00296, filed on Jun. 14, 2002.

(30) Foreign Application Priority Data

Jun. 15, 2001    (ES)    ............................. 200101471

(51) Int. Cl.
*C02F 1/70*    (2006.01)
*A62D 3/37*    (2007.01)
*B01J 23/00*    (2006.01)
*B01J 21/00*    (2006.01)
*B01J 20/00*    (2006.01)

(52) U.S. Cl. .................. 210/757; 588/319; 502/327; 502/328; 502/331; 502/332; 502/333; 502/334; 502/339; 502/341; 502/346; 502/355; 502/415; 502/439

(58) Field of Classification Search ............... 502/327, 502/328, 331, 332, 333, 334, 339, 341, 346, 502/355, 415, 439; 210/757; 588/319
See application file for complete search history.

(56) References Cited

U.S. PATENT DOCUMENTS

| | | | |
|---|---|---|---|
| 4,990,266 A * | 2/1991 | Vorlop et al. | 210/748.11 |
| 5,039,645 A * | 8/1991 | Elliott et al. | 502/217 |
| 5,439,861 A * | 8/1995 | Bhattacharyya et al. | 502/84 |
| 5,507,956 A * | 4/1996 | Bonse et al. | 210/757 |
| 5,614,163 A * | 3/1997 | Bhattacharyya et al. | 423/418.2 |
| 5,779,915 A * | 7/1998 | Becker et al. | 210/757 |
| 5,863,444 A * | 1/1999 | Murphy et al. | 210/743 |
| 5,935,420 A * | 8/1999 | Baird et al. | 208/213 |
| 6,028,023 A * | 2/2000 | Vierheilig | 502/84 |
| 6,030,520 A * | 2/2000 | Dziewinski et al. | 205/771 |
| 6,638,889 B1 * | 10/2003 | Van Berge et al. | 502/300 |
| 6,929,736 B2 * | 8/2005 | Vierheilig | 208/122 |
| 7,112,313 B2 * | 9/2006 | Vierheilig | 423/244.02 |
| 2006/0276328 A1 * | 12/2006 | Vierheilig | 502/60 |

* cited by examiner

*Primary Examiner*—Cam N Nguyen
(74) *Attorney, Agent, or Firm*—Klauber & Jackson, LLC

(57) ABSTRACT

A catalyst which, by means of a reduction reaction at ambient temperature, permits the elimination of nitrates and nitrites in waters. The catalyst comprises a combination of a noble metal and a non-noble metal supported on or incorporated into the structure of a support which, in elemental and anhydrous form, has the formula XYMgAl, in which X is at least one noble metal, Y is at least one non-noble metal, Mg is magnesium and Al is aluminum, the Mg and Al preferably forming the structure of a hydrotalcite or a mixed oxide deriving from a hydrotalcite.

9 Claims, 3 Drawing Sheets

BIMETALLIC CATALYST FOR THE TREATMENT OF WATER CONTAINING NITRATES

RELATED APPLICATIONS

The present application is a Division of U.S. Ser. No. 10/735,597, filed Dec. 12, 2003 now abandoned, which is a Continuation of co-pending PCT Application No. PCT/ES02/00296, filed Jun. 14, 2002, which in turn, claims priority from Spanish Application Ser. No. 200101471, filed Jun. 15, 2001. Applicants claim the benefits of 35 U.S.C. §120 as to the PCT application and priority under 35 U.S.C. §119 as to said Spanish application, and the entire disclosures of all applications are incorporated herein by reference in their entireties.

FIELD OF THE INVENTION

The present invention belongs to the field of catalysts, particularly that of bimetallic catalysts, useful in the purification of natural waters by means of catalytic elimination of nitrates and nitrites that are present.

STATE OF THE ART PRIOR TO THE INVENTION

The contamination of natural waters by nitrates is one of the most important problems that has arisen in recent years in virtually all countries in the world. The increase in the concentration of nitrates in water is directly related to the massive use of fertilisers in farming and to the waste generated by livestock farms, which has produced a major problem of contamination in natural waters.

Nitrates are stable ions highly soluble in water, which can be eliminated by physical/chemical treatments such as ion exchange, reverse osmosis and electrodialysis. Nevertheless, these techniques end up by generating a concentrated solution of these ions and it is therefore necessary to employ other techniques that are more respectful of the environment [A, Kapoor and T. Viraraghavan, J., Environ. Eng., 123 (4), 371 (1997)].

Another possibility of eliminating nitrates from water consists of using biological treatments. Nevertheless, these techniques are not applicable for natural waters since they could occasion a bacteriological contamination of it, generate organic waste and increase the chorine demand of the purified water.

All this has led to the search for processes that would permit nitrates to be converted directly into nitrogen in a way that is direct and cheap, which could be achieved by means of catalytic hydrogenation of nitrates in aqueous solutions.

Conventional catalytic techniques aim to reduce the nitrate ions present in water by employing, for example, hydrogen as a reducing agent on a solid catalyst. The reduction process can be represented by the overall reaction:

$$2NO_3^- + 5H_2 \cdot 2N_2 + 2OH^- + 4H_2O \qquad (1)$$

in which the nitrates are selectively converted into nitrogen without generating any solid or liquid waste and operating at room temperature. Nevertheless, this reaction passes through an intermediate stage, which is the formation of nitrite ions, which can give rise to a secondary reaction leading to the formation of ammonia, which is an undesirable product in natural waters [Hörold, S., Vorlop, K. D., Tacke, T., Sell, M., Catal. Today 17, 21 (1993); Pintar, A., Batista, J., Levec, J., Kajiuchi, T., Appl. Catal. B: Environ. 11, 81 (1996)].

With respect to the catalyst, a detailed study of the reaction indicates that the nitrites can be easily eliminated with any hydrogenation catalyst, but a second co-catalyst needs to be added in order to achieve the reduction of nitrates to nitrites [Hörold, S., Vorlop, K. D., Tacke, T., Sell, M., Catal. Today 17, 21 (1993)]. The hydrogenation catalyst that presents greater activity for the reduction of nitrates without generating ammonia is Pd followed by Pt and, a long way behind, Rh, Ir and Ru [Hörold, S., Vorlop, K. D., Tacke, T., Sell, M., Catal. Today 17, 21 (1993)]. This leads to palladium being the metal that is mainly used. Nevertheless, as stated earlier, it has to be considered that, in order to eliminate the nitrates, a second active metal needs to be added. Different metals (Fe, Co, Pt, Ni, Ag and Cu) have been studied [Hörold, S., Vorlop, K. D., Tacke, T., Sell, M., Catal. Today 17, 21 (1993); Vorlop, K. D., Tacke, T., Sell, M., Strauss, G., DE 3906781; U. Prusse, M. Halhein, J., Daum, K. D., Vorlop, Catal. Today, 55, 79 (2000); Pintar, A., Levec, J., SI 9500357], and it was observed that the best results in the elimination of nitrates, with a minimum quantity of ammonia being formed, were achieved with a bimetallic catalyst of Pd—Cu of ratio 4:1, in which the support was initially impregnated with the copper phase and on which the palladium phase was added [Batista, J., Pintar, A., Ceh, M., Catal. Letters 43, 79 (1997)].

Various types of support [Gasparovicova, D., Kralik, M., Hronec, M., Collect. Czech. Chem. Commun. 64, 502 (1999); Lecloux, A. J., Cat. Today 53 23 (1999)] have been used alumina, silica, anionic polymers, etc., the most suitable being those presenting a larger specific surface area and which have a high pore diameter and volume, in order to reduce the problems of diffusion.

More recently, it has been described that other metals supported on alumina, such as Pd—Zn, Pd—Sn and Pd—In, also catalyse this reaction, with a high selectivity to the formation of nitrogen, Pd—Sn being the one that gives best results, though diminishing the period of life of the catalyst [Berndt, H., Moeninnich, I., Luecke, B., Hahnlein, M., Vorlop, K. D., EuropaCat-3, Vol. 1, 38412; U. Prüsse, M N. Kröger, K. D. Vorlop, Chem. Ing. Technik 69, 93 (1997)]. Other systems studied consist of Pd—Cu catalysts prepared by impregnation of zirconium or titanium supports, the system Pd—Cu—$TiO_2$ presenting greatest activity and generating [Centi, G., Modafferi, V., Perathoner, S., European Research Conference: Natural waters and water technology. Catalytic Science and Technology for water, October 1998] a lower concentration of nitrites.

Finally, another possibility described is the use of formic acid as a reducing agent, since the formate ions generated would act as a buffer [U. Prüsse, M N. Kröger, K. D. Vorlop, Chem. Ing. Technik 69, 87 (1997)], thus control over the pH would be unnecessary. There would also be a greater local concentration of hydrogen on the active centres formed by the decomposition of formic acid and an acid environment would be generated, which would improve the selectivity and yield of the reaction. Nevertheless, it has the drawback that very strict control would be needed over the waters in order to prevent contamination by formic acid, which can be much more dangerous.

DESCRIPTION OF THE INVENTION

The present invention aims to overcome the drawbacks of conventional treatments of waters containing nitrates by means of a catalyst for the reduction of nitrates in waters in which it has been surprisingly seen that a support with an Mg/Al structure and especially with a hydrotalcite structure in the formulation of the overall catalyst produces a catalyst that is very active, selective and stable.

So, the present invention refers to a bimetallic catalyst for the treatment of waters containing nitrates, which comprises a support and at least one noble metal and at least one non-noble metal, characterized in that the support, in elemental and anhydrous form, has a composition corresponding to the formula:

XYMgAl, in which

X is at least one noble metal, preferably selected among Pd, Pt, Ru, Ir and Rh;

Y is at least one non-noble metal, preferably selected among Cu, Sn, Zn, In, Ni, Ag, Fe or Co, Mg is magnesium, Al is aluminium.

In the catalyst according to the invention, Mg and Al preferably form a hydrotalcite structure.

In accordance with the invention, the metals can have been incorporated into the hydrotalcite structure by impregnation or during the synthesis stage of the hydrotalcite.

Likewise, the non-noble metal or metals can have been incorporated into the hydrotalcite structure during the synthesis stage of the hydrotalcite, in which case the noble metal or metals have been incorporated by impregnation in a stage subsequent to the synthesis stage.

In an embodiment of the support, Mg and Al are present in the form of aluminium and magnesium oxides obtained from a precursor of hydrotalcite by calcination in air at temperatures between 350 and 800° C., for a period of between 1 and 20 hours. According to this embodiment, at least one noble metal and at least one non-noble metal can have been incorporated into the structure of the hydrotalcite precursor during the synthesis stage of the hydrotalcite. In another embodiment of the support, the non-noble metal or metals have been incorporated into the structure of the precursor during the synthesis stage of the hydrotalcite in order to form oxides of Mg/Al/non-noble metal, in which case the noble metal or metals have been incorporated by impregnation in a stage subsequent to the synthesis stage.

The catalyst of the present invention is useful for water treatment processes wherein the nitrates are eliminated in the liquid phase, and which consist of reducing the nitrates to nitrogen using a reducing agent, such as might be for example hydrogen, formic acid, hydrocarbons and combinations thereof.

The hydrotalcite consists of a laminar structure that can be considered to derive from that of brucite, $Mg(OH)_2$, wherein some of the magnesium atoms octahedrally coordinated by OH groups and which form an infinite two-dimensional lamina, have been replaced with trivalent metals (in this case, $Al^{3+}$), thereby generating an excess of positive charge in the lamina which has to be compensated with anions (normally, $CO_3^{2-}$) which are located in the interlaminar space. The laminas are stacked one on top of another, giving rise to a laminar structure for these compounds.

Hydrotalcite can be prepared by, for example, co-precipitation of a solution containing the appropriate metals in the form of soluble salts, preferably aluminium nitrates and magnesium nitrate, with an alkaline solution formed by a mixture of hydroxides and alkaline carbonates, preferably NaOH and $Na_2CO_3$, in sufficient concentration for achieving total precipitation of the metals of the first solution.

The two solutions are mixed vigorously. The resulting gels are aged for between 3 and 20 hours at a temperature between 20 and 250° C.

Following the ageing, the products are filtered and washed until the filtrate has a pH between 6.8 and 7.5. Finally, the product is calcined at a temperature above 300° C.

Other different procedures for the preparation of hydrotalcite have been published in the literature [Cavani, F., Trifiro, F., Vaccari, A. Catal. Today, 11 173 (1991); Miyata, S., Clays Clay Miner., 28, 50 (1980); Allmann, R., Jepsen, H. P., Neues Jarhb. Min., Monatsch., 544 (1969), Reichle, W. T., Chemtech, January 58 (1986)].

The noble metal, preferably Pd, Pt, Ru, Ir or Rh, and the non-noble metal, preferably Cu, Sn, Zn, In, Ni, Fe, Ag or Co, are impregnated on a hydrotalcite base. These metals are incorporated by impregnation at a temperature between 10 and 100° C., and preferably between 15 and 80° C., on the hydrotalcite starting from an aqueous solution of a soluble salt which, when calcined, produces the corresponding oxide on the hydrotalcite. The percentage of noble metal oxide with respect to the mixture obtained is between 0.1 and 30% by weight, preferably between 0.5 and 15% by weight. The preferred percentage of non-noble metal lies in the range 0.05% to 10% by weight.

One or two metals can also be incorporated into the hydrotalcite by adding a soluble salt of the metal to the solution that contained the Mg and Al salts during the synthesis stage. In this case, the concentrations are adjusted in order to obtain the desired proportions of metals in the final catalyst. So, for example, if it is wished to incorporate copper into the structure of the hydrotalcite, the necessary amount of a copper compound, such as for example copper nitrate, is added to the solution of aluminium nitrate and magnesium nitrate in order to obtain the quantity of copper that is desired in the final product.

In the case of the metallic compounds being deposited by impregnation, the synthesised hydrotalcite, or preferably hydrotalcite synthesised at a temperature between 350 and 800° C. for a period of between 1 and 20 hours, or more preferably hydrotalcite calcined at between 400 and 600° C. for a period of between 1 and 12 hours, can be used as support. The calcination is carried out in the presence of air and preferably in the absence of $CO_2$.

When one of the metallic components is incorporated during the synthesis stage, the second metal can be incorporated by impregnation on the hydrotalcite structure or preferably on the structure resulting from calcining the synthesis hydrotalcite according to the calcination conditions stated above.

In the case that all the metallic components were introduced during the synthesis stage, the resulting material can be used as a catalyst or preferably calcined according to the conditions described above before being used as a catalyst.

The material is suitable for the treatment of waters containing nitrates and nitrites, in particular for eliminating nitrates present in natural waters. In the presence of a reducing agent, preferably hydrogen or a source of hydrogen, such as for example hydrocarbons dissolved in nitrogen, the catalyst reduces the nitrates to nitrogen, forming a minimum quantity of ammonia.

BRIEF DESCRIPTION OF THE DRAWINGS

Described below are some examples of embodiment of the invention. In some of the examples, reference will be made to the drawings, which form an integral part of this specification, and in which.

EXAMPLES

Figure 1:
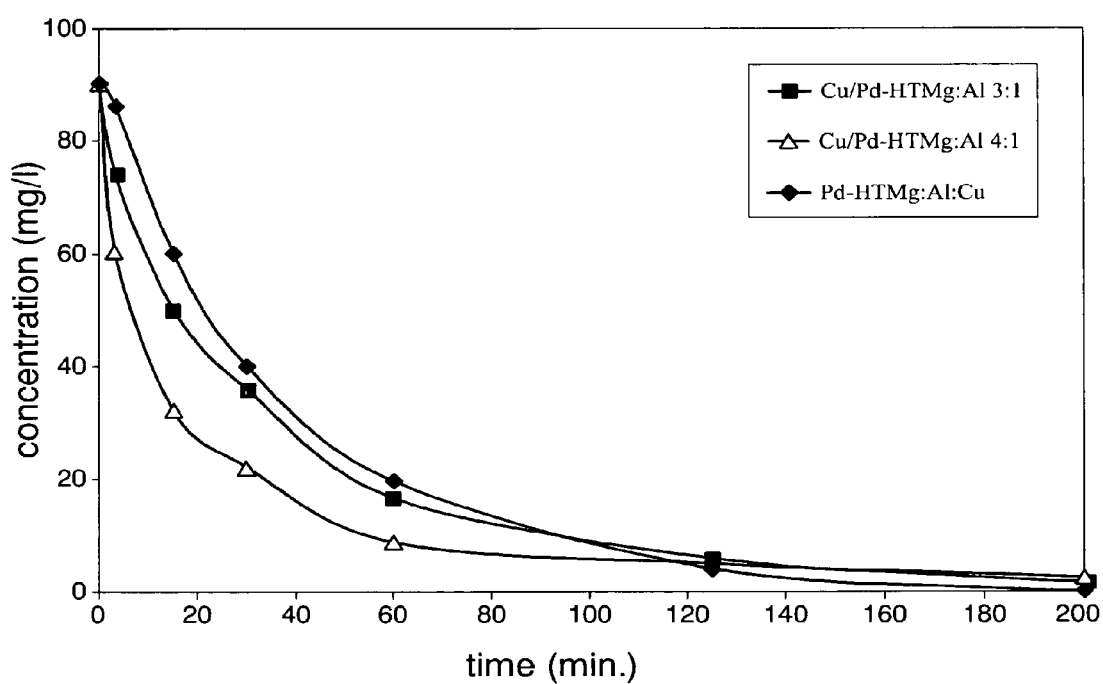
FIG. 1 shows the concentration of nitrates against reaction time in the catalysts of examples 1, 2 and 3, according to the reaction conditions described in example 4.

Preparation of a Sample of Pd/Cu Catalyst supported on a hydrotalcite of ratio Mg:Al=3:1.

850 ml of an aqueous solution (A) of $Mg(NO_3)_2$ and $Al(NO_3)_3$, 1.125 M in Mg(II) and 0.375 M in Al (III), and an aqueous solution (B): 3.375 M of NaOH and 1 M of $Na_2CO_3$ are prepared. The two solutions are mixed while being vigorously stirred and the pH is kept at 13.

The precipitate is then left to age for 18 h at 80° C. and it is filtered and washed until the pH of the wash waters is 7. The sample obtained is calcined at 750° C., with the BET area being 178 $m^2.g^{-1}$.

Having obtained the hydrotalcite of ratio Mg:Al=3:1 that is going to be used as support, the necessary quantity of copper is then impregnated at pore volume in order to 1.5% by weight of copper. The impregnated material is then dried and calcined at 500° C. The necessary quantity of palladium is then impregnated at pore volume in order to 5% by weight of palladium. It is then dried and calcined at 500° C.

Example 2

Preparation of a Sample of Pd/Cu Catalyst supported on a hydrotalcite of ratio Mg:Al=4:1.

Following the same preparation procedure as described in example 1, a catalyst is prepared starting from a solution (A): 1.2 M in Mg(II) and 0.3 M in Al (III), and an aqueous solution (B): 3.33 M of NaOH and 1 M of $Na_2CO_3$ are prepared.

After ageing, filtering, washing and calcining in the manner described in example 1, a material is obtained with a surface area of 165 $m^2.g^{-1}$.

Having obtained the hydrotalcite of ratio Mg:Al=4:1 that is going to be used as support, one proceeds as described in example 1 in order to obtain on this support 5% of Pd and 1.5% of Cu.

Example 3

Preparation of a Sample of Pd/Cu Catalyst supported on a hydrotalcite of ratio Mg:Al:Cu=2.4:1:0.034.

850 ml of an aqueous solution (A) of $Mg(NO_3)_2$, $Al(NO_3)_3$ and $Cu(NO_3)_2$: 1.05 M in Mg(II), 0.435 M in Al (III) and 0.015 in Cu (II) and an aqueous solution (B): 3.435 M of NaOH and 1 M of $Na_2CO_3$ are prepared. The two solutions are mixed while being vigorously stirred and the pH is kept at 13.

The precipitate is then left to age for 18 h at 80° C. and it is filtered and washed until the pH of the wash waters is 7. The sample obtained is calcined at 750° C., with the BET area being 170 $m^2.g^{-1}$ and the copper content being 1.5% weight.

Having obtained the hydrotalcite Mg:Al:Cu, the necessary quantity of palladium is then impregnated at pore volume in order to 5% by weight of palladium. The impregnated material is dried and calcined at 500° C.

Example 4

Use of the Catalyst of Example 1 to Eliminate Nitrates

The catalyst of example 1 is used in order to evaluate its capacity for elimination of nitrates. The material is first reduced in a flow of hydrogen at 500° C. for 2 hours and then hydrogenated in the liquid phase for 60 minutes at ambient temperature. In this example, 0.8 g of catalyst is used in order to try to eliminate the nitrates present in 600 ml of a solution with a nitrates concentration of 90 mg/l. The reaction is left to take place for 2 hours and the evolution of the concentration of nitrates, nitrites and $NH_4^+$ during the reaction can be seen in FIGS. 2 and 3.

Example 5

Use of the Catalyst of Example 2 to Eliminate Nitrates

Figure 2:
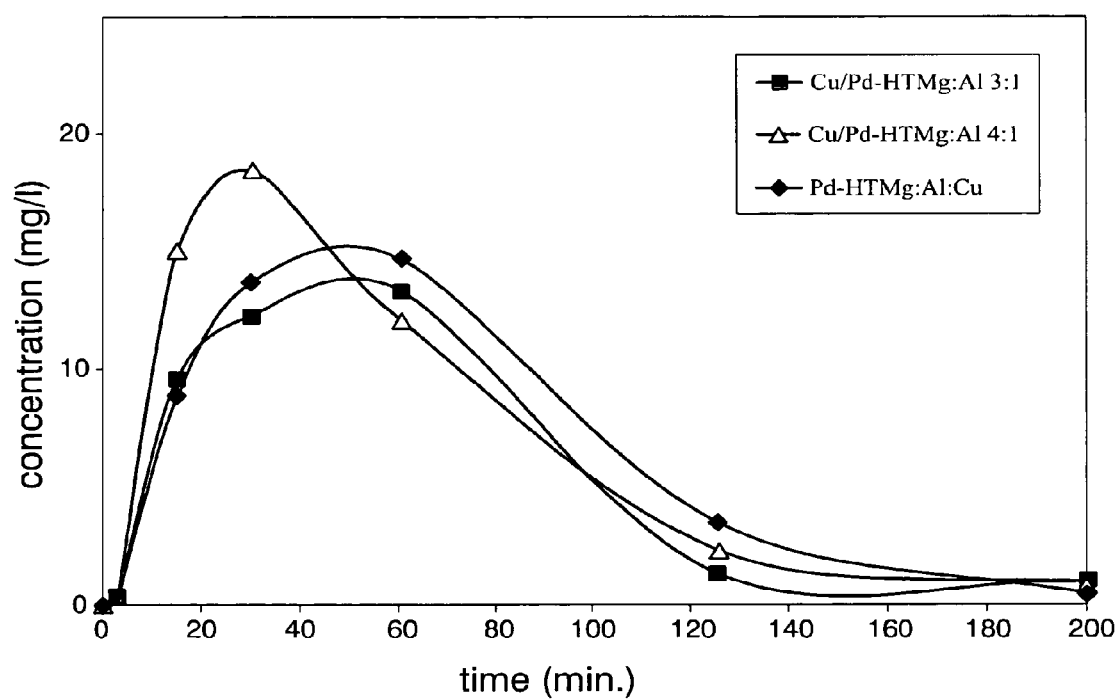
FIG. 2 shows the concentration of nitrites against reaction time in the catalysts of examples 1, 2 and 3, according to the reaction conditions described in example 4.
Figure 3:
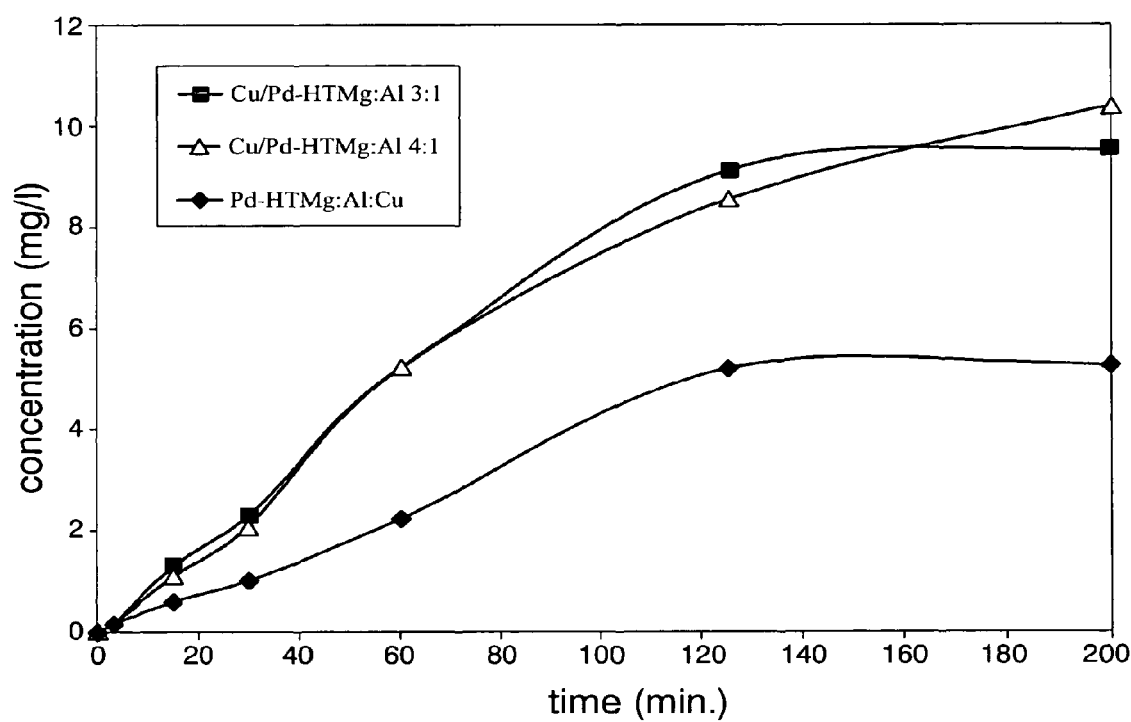
FIG. 3 shows the concentration of ammonium against reaction time in the catalysts of examples 1, 2 and 3, according to the reaction conditions described in example 4.

The catalyst of example 2 is used in order to evaluate its capacity for elimination of nitrates following the same process as that described in example 4 and with the results shown in FIGS. 1, 2 and 3 being observed.

Example 6

Use of the Catalyst of Example 3 to Eliminate Nitrates

The catalyst of example 3 is used in order to evaluate its capacity for elimination of nitrates following the same process as that described in example 4 and with the results obtained in FIGS. 1, 2 and 3 being observed.

The invention claimed is:

1. A process for treating waters to eliminate nitrates present in liquid phase therein, said process comprising (a) treating said waters with a bimetallic catalyst said bimetallic catalyst in elemental and anhydrous form, having a composition corresponding to the formula XYMgAl wherein:
   X is at least one noble metal;
   Y is at least one non-noble metal;
   Mg is magnesium; and
   Al is aluminum, and
(b) reducing the nitrates to nitrogen by adding a reducing agent.

2. A process in accordance with claim 1, wherein the reducing agent is selected from the group consisting of hydrogen, formic acid, hydrocarbons and combinations thereof.

3. A process in accordance with claim 1, wherein Mg and Al form a hydrotalcite structure.

4. A process in accordance with claim 1, wherein the noble metal is selected from the group consisting of Pd, Pt, Ru, Ir and Rh.

5. A process in accordance with claim 1, wherein the noble metal is present in a proportion of 0.1 to 30% by weight, preferably from 0.5 to 15% by weight, based on the total weight of the catalyst.

6. A process in accordance with claim 1, wherein the noble metal is Pd.

7. A process in accordance with claim 1, wherein the non-noble metal is selected from the group consisting of Cu, Sn, Zn, In, Ni, Ag, Fe and Co.

8. A process in accordance with claim 1, wherein the non-noble metal is present in a proportion 0.5 to 10% by weight, based on the total weight of the catalyst.

9. A process in accordance with claim 1, wherein the non-noble metal is Cu.

* * * * *